United States Patent
Korhonen et al.

(10) Patent No.: US 12,082,012 B2
(45) Date of Patent: Sep. 3, 2024

(54) SELECTIVE REFERENCE SIGNAL MEASUREMENTS

(71) Applicant: NOKIA TECHNOLOGIES OY, Espoo (FI)

(72) Inventors: Juha Sakari Korhonen, Espoo (FI); Esa Tapani Tiirola, Oulu (FI); Keeth Saliya Jayasinghe Laddu, Espoo (FI); Ilkka Antero Keskitalo, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 518 days.

(21) Appl. No.: 17/432,724

(22) PCT Filed: Feb. 22, 2019

(86) PCT No.: PCT/EP2019/054441
§ 371 (c)(1),
(2) Date: Aug. 20, 2021

(87) PCT Pub. No.: WO2020/169206
PCT Pub. Date: Aug. 27, 2020

(65) Prior Publication Data
US 2022/0141686 A1    May 5, 2022

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01)

(58) Field of Classification Search
None
See application file for complete search history.

(56) References Cited

U.S. PATENT DOCUMENTS

| | | |
|---|---|---|
| 2013/0294390 A1 | 11/2013 | Yang et al. |
| 2015/0189613 A1 | 7/2015 | Chen et al. |

(Continued)

FOREIGN PATENT DOCUMENTS

| | | |
|---|---|---|
| CN | 102656938 A | 9/2012 |
| EP | 3216289 A1 | 9/2017 |

(Continued)

OTHER PUBLICATIONS

"3rd Generation Partnership Project; Technical Specification Group Radio Access Network; NR; Study on Integrated Access and Backhaul; (Release 16)", 3GPP TR 38.874 v16.0.0, (Dec. 2018), 111 pages.

(Continued)

*Primary Examiner* — Alex Skripnikov
(74) *Attorney, Agent, or Firm* — Lippes Mathias LLP

(57) ABSTRACT

According to the disclosure there is provided an apparatus comprising means for performing: receiving a configuration for a distributed unit of the apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

17 Claims, 8 Drawing Sheets

(56) References Cited

U.S. PATENT DOCUMENTS

| | | | |
|---|---|---|---|
| 2017/0367120 A1 | 12/2017 | Murray et al. | |
| 2018/0302201 A1 | 10/2018 | Yoo et al. | |
| 2019/0036585 A1 | 1/2019 | Hosseini et al. | |
| 2020/0229271 A1* | 7/2020 | You | H04W 72/23 |

FOREIGN PATENT DOCUMENTS

| | | | |
|---|---|---|---|
| GB | 2568943 B | 2/2022 | |
| WO | WO 2013/170713 A1 | 11/2013 | |
| WO | 2016/071176 A1 | 5/2016 | |
| WO | WO 2018/001452 A1 | 1/2018 | |
| WO | 2018/028892 A1 | 2/2018 | |
| WO | 2018/137223 A1 | 8/2018 | |

OTHER PUBLICATIONS

International Search Report and Written Opinion for Patent Cooperation Treaty Application No. PCT/EP2019/054441 dated Oct. 22, 2019, 13 pages.

Nokia et al., "Measurements with Iab", 3GPP TSG RAN WG1 Meeting #94, R1-1808581, (Aug. 20-24, 2018), 6 pages.

Qualcomm, "New WID: Integrated Access and Backhaul for NR", 3GPP TSG RAN Meeting #82, RP-182322, (Dec. 10-13, 2018), 7 pages.

Qualcomm, "New WID: Integrated Access and Backhaul for NR", 3GPP TSG RAN Meeting #82, RP-182882, (Dec. 10-13, 2018), 7 pages.

First Examination Report for Indian Application No. 202147041827 dated Apr. 12, 2022, 5 pages.

Office Action received for corresponding Chinese Patent Application No. 201980095326.8, dated Feb. 29, 2024, 10 pages of Office Action and No. page of translation available.

Office action received for corresponding European Patent Application No. 19708259.7, dated May 2, 2024, 5 pages.

* cited by examiner

SELECTIVE REFERENCE SIGNAL MEASUREMENTS

CROSS-REFERENCE TO RELATED APPLICATIONS

This application is a national phase entry of International Application No. PCT/EP2019/054441, filed Feb. 22, 2019, the entire contents of which are incorporated herein by reference.

FIELD

This disclosure relates to communications, and more particularly to an apparatus, method and computer program for use in a wireless communication system. More particularly the present invention relates to integrated access and backhaul.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. In a wireless system at least a part of communications occurs over wireless interfaces.

A user can access a communication system by means of an appropriate communication device or terminal capable of communicating with a base station. Hence nodes like base stations are often referred to as access points. A communication device of a user is often referred to as user equipment (UE).

A communication system and associated devices typically operate in accordance with a given standard or specification which sets out what the various entities associated with the system are permitted to do and how that should be achieved.

Since introduction of fourth generation (4G) services increasing interest has been paid to the next, or fifth generation (5G) standard. 5G may also be referred to as a New Radio (NR) network. Standardization of the first 5G or New Radio networks release has been finalized in 3GPP release 15 (R15). 5G standardization continues for R16 that will include specification for integrated access and backhaul (IAB).

STATEMENT OF INVENTION

According to a first aspect there is provided an apparatus comprising means for performing receiving a configuration for a distributed unit of the apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to some examples, the means are further configured to perform using the time domain resource of the apparatus for communication of data instead of for measurement of received reference signals, when it is determined that the measurement of received reference signals is not required.

According to some examples, the means are further configured to perform the communication of data using the distributed unit in accordance with a resource configuration of the distributed unit.

According to some examples, the means are further configured to perform the communication of data on a downlink child-link to a child node of the apparatus.

According to some examples, the means are further configured to perform the communication of data in response to an indication that communication of data is allowed.

According to some examples, the means are further configured to perform receiving the indication by one or more of the following signalling schemes: a radio resource control message; a semi-static configuration of the mobile termination unit; a semi-static configuration of the distributed unit; a combination of mobile termination unit configuration and distributed unit configuration; an implicit indication; dedicated Downlink Control Information; group common Downlink Control Information.

According to some examples, the means are further configured to perform configuring the distributed unit in a downlink-soft or flexible-soft configuration for communication of data with a child node.

According to some examples, the means are further configured to perform configuring the mobile termination unit in a flexible configuration or downlink configuration for communication of data with a child node.

According to some examples, the means are further configured to perform communication of data with a child node when a mobile termination unit of the child node is not measuring reference signals or a distributed unit of the child node is not transmitting reference signals.

According to some examples, the means are further configured to perform making the distributed unit unavailable for the communication of data.

According to some examples, the means are further configured to receive a soft resource configuration for the distributed unit when a resource configuration is not available for a parent node of the distributed unit.

According to some examples, the means are further configured to perform receiving the indication from one or more of: a Central Unit; a parent node.

According to some examples, the means are further configured to perform determining that the measurement of received reference signals is not required when an indication is received at the apparatus indicating that a reference signal is not present, or it is determined based on an earlier measurement that the reference signal is below a predefined threshold.

According to some examples, the means are further configured to perform determining that the measurement of received reference signals is not required based on discovery and monitoring performance requirements of the apparatus, and a determination that the performance requirements of the apparatus are being met.

According to some examples, the reference signals comprise Synchronization Signals or Channel State Information Reference symbols for integrated access and backhaul stage 2 discovery.

According to some examples, the apparatus comprises an integrated access and backhaul node.

According to some examples, the means are further configured to perform receiving the transmission pattern but not the reception pattern at the distributed unit, and receiving the reception pattern but not the transmission pattern at the mobile termination unit.

According to some examples, the means comprise: at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: receiving a configuration for a distributed unit of the apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to a third aspect there is provided an apparatus comprising: receiving circuitry for receiving a configuration for a distributed unit of the apparatus for transmitting reference signals using a time domain resource of the apparatus, in accordance with a time domain transmission pattern; and receiving circuitry for receiving a configuration for a mobile termination unit of the apparatus for reception of reference signals using the time domain resource of the apparatus, in accordance with a time domain reception pattern; and selecting circuitry for selectively measuring received reference signals in dependence on a determination of whether measurement of received reference signals is required.

According to a fourth aspect there is provided a method comprising: receiving a configuration for a distributed unit of an apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to some examples, the method comprises using the time domain resource of the apparatus for communication of data instead of for measurement of received reference signals, when it is determined that the measurement of received reference signals is not required.

According to some examples, the method comprises performing the communication of data using the distributed unit in accordance with a resource configuration of the distributed unit.

According to some examples, the method comprises performing the communication of data on a downlink childlink to a child node of the apparatus.

According to some examples, the method comprises performing the communication of data in response to an indication that communication of data is allowed.

According to some examples, the method comprises receiving the indication by one or more of the following signalling schemes: a radio resource control message; a semi-static configuration of the mobile termination unit; a semi-static configuration of the distributed unit; a combination of mobile termination unit configuration and distributed unit configuration; an implicit indication; dedicated Downlink Control Information; group common Downlink Control Information.

According to some examples, the method comprises configuring the distributed unit in a downlink-soft or flexible-soft configuration for communication of data with a child node.

According to some examples, the method comprises configuring the mobile termination unit in a flexible configuration or downlink configuration for communication of data with a child node.

According to some examples, the method comprises performing communication of data with a child node when a mobile termination unit of the child node is not measuring reference signals or a distributed unit of the child node is not transmitting reference signals.

According to some examples, the method comprises making the distributed unit unavailable for the communication of data.

According to some examples, the method comprises receiving a soft resource configuration for the distributed unit when a resource configuration is not available for a parent node of the distributed unit.

According to some examples, the method comprises receiving the indication from one or more of: a Central Unit; a parent node.

According to some examples, the method comprises determining that the measurement of received reference signals is not required when an indication is received at the apparatus indicating that a reference signal is not present, or it is determined based on an earlier measurement that the reference signal is below a predefined threshold.

According to some examples, the method comprises determining that the measurement of received reference signals is not required based on discovery and monitoring performance requirements of the apparatus, and a determination that the performance requirements of the apparatus are being met.

According to some examples, the reference signals comprise Synchronization Signals or Channel State Information Reference symbols for integrated access and backhaul stage 2 discovery.

According to some examples, the method is carried out at an integrated access and backhaul node.

According to some examples, the method comprises receiving the transmission pattern but not the reception pattern at the distributed unit, and receiving the reception pattern but not the transmission pattern at the mobile termination unit.

According to a fifth aspect there is provided a computer program comprising instructions for causing an apparatus to perform at least the following: receiving a configuration for a distributed unit of the apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to a sixth aspect there is provided a computer program comprising instructions stored thereon for performing at least the following: receiving a configuration for a distributed unit of an apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to a seventh aspect there is provided a non-transitory computer readable medium comprising program instructions for causing an apparatus to perform at least the following: receiving a configuration for a distributed unit of the apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to an eighth aspect there is provided a non-transitory computer readable medium comprising program instructions stored thereon for performing at least the following: receiving a configuration for a distributed unit of an apparatus for transmitting reference signals using a time domain resource of the apparatus, in accordance with a time domain transmission pattern; and receiving a configuration for a mobile termination unit of the apparatus for reception of reference signals using the time domain resource of the apparatus, in accordance with a time domain reception pattern; and selectively measuring received reference signals in dependence on a determination of whether measurement of received reference signals is required.

According to a ninth aspect there is provided an apparatus comprising means for performing: sending a configuration to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

According to some examples, the means comprise: at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: sending a configuration to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

According to an eleventh aspect there is provided an apparatus comprising: sending circuitry for sending a configuration to a further apparatus for configuring a distributed unit of the further apparatus for transmitting reference signals using a time domain resource of the further apparatus, in accordance with a time domain transmission pattern; and sending circuitry for sending a configuration to the further apparatus for configuring a mobile termination unit of the further apparatus for reception of reference signals using the time domain resource of the apparatus, in accordance with a time domain reception pattern; and sending circuitry for sending a configuration to the further apparatus for configuring the further apparatus to selectively use received reference signal measurement resources for data communication, in dependence on a determination of whether measurement of received reference signals is required by the further apparatus.

According to a twelfth aspect there is provided a method comprising: sending a configuration to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

According to a thirteenth aspect there is provided a computer program comprising instructions for causing an apparatus to perform at least the following: sending a configuration to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

According to a fourteenth aspect there is provided a computer program comprising instructions stored thereon for performing at least the following: sending a configuration from an apparatus to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

According to a fifteenth aspect there is provided a non-transitory computer readable medium comprising program instructions for causing an apparatus to perform at least the following: sending a configuration to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

According to a sixteenth aspect there is provided a non-transitory computer readable medium comprising program instructions stored thereon for performing at least the following: sending a configuration from an apparatus to a further apparatus for configuring a distributed unit of the further apparatus for transmitting reference signals using a time domain resource of the further apparatus, in accordance with a time domain transmission pattern; and sending a configuration to the further apparatus for configuring a mobile termination unit of the further apparatus for reception of reference signals using the time domain resource of the apparatus, in accordance with a time domain reception pattern; and sending a configuration to the further apparatus for configuring the further apparatus to selectively use received reference signal measurement resources for data communication, in dependence on a determination of whether measurement of received reference signals is required by the further apparatus.

BRIEF DESCRIPTION OF FIGURES

The invention will now be described in further detail, by way of example only, with reference to the following examples and accompanying drawings, in which.

DETAILED DESCRIPTION

The present disclosure relates to integrated access and backhaul (IAB). In IAB, the same spectral resources and infrastructure are used to serve both the user equipment (UE) in access as well as the bases stations (e.g. gNBs) in backhaul. The disclosure is also equally valid for different out-band relay scenarios, such as out-band multi-hop backhaul. In this scenario, the access link for UE may be realized by different radio technology (such as LTE or WiFi), or by different frequency layer (e.g. using NR or NR-Unlicensed band technology operating at other frequency bands). A 3GPP study item on IAB was finished in 2018 and is discussed in 3GPP TR38.874.

A feature of 5G NR is that it allows network deployment with minimized manual efforts, and as automated self-configuration as possible. However, especially on higher frequency bands the coverage may be problematic and specific capabilities are needed for NR to enable effortless coverage extensions with minimized/no requirements for network (re-)planning in a fast and cost-effective manner. For these reasons, 3GPP specifies the IAB proposal with capabilities enabling wireless backhauling for NR sites that do not have fixed (e.g. wired/fibre) connection to the network. Using radio connection for backhauling will eliminate the need for cabling of all sites of the radio network (which can be very dense), which dramatically reduces initial deployment costs.

Furthermore, in IAB the intention is to use the same carrier for both backhaul and access links, sharing the same radio resources and radio transceivers. Frequency bands especially applicable for IAB are those having sufficient capacity, i.e. large enough carrier bandwidths. Those carriers are on mmWave bands which typically are unpaired time division duplex (TDD) bands. Furthermore, IAB may use the half-duplex constraint, i.e. no simultaneous transmission and reception to avoid excessive interference between transmitter and receiver.

Yet another requirement for IAB is the support for multi-hop relaying where an IAB node may provide wireless BH link for the next-hop IAB node. The serving node providing the BH connection is called a parent node, where the parent node can be either a donor node (with wired network connection), or another IAB node. The served IAB node is called a child node.

Figure 1:
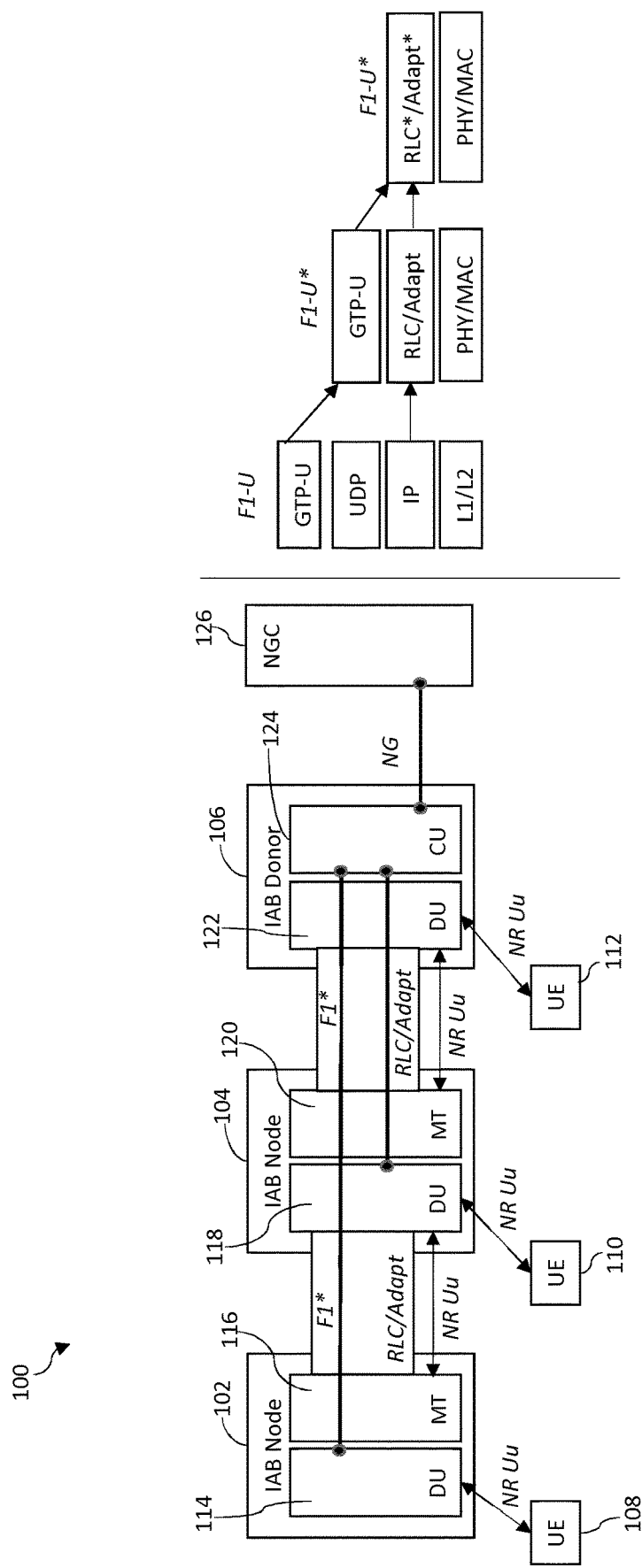
FIG. 1 shows a schematic example of an integrated access and backhaul architecture where the invention may be implemented.

FIG. 1 shows a known IAB architecture 100 for multi-hop L2 relaying with a distributed base station. In FIG. 1 two IAB nodes are shown, namely IAB nodes 102 and 104, and an IAB donor node 106. In this example UE 108 is communicating with IAB node 102, UE 110 is communicating with IAB node 104, and UE 112 is communicating with IAB donor node 106. IAB node 102 comprises a distributed unit (DU) and a mobile termination (MT) 116. IAB node 104 comprises a DU 118 and an MT 120. IAB donor node 106 comprises a DU 122 and a centralized unit (CU) 124. In this example IAB node 106 is considered the IAB donor node, in that it provides the backhaul connection to the core network, or "next generation core" (NGC), 126. In this example node 106 is the parent of node 104, and node 104 is the parent of node 102. Likewise node 102 is the child of node 104, and node 104 is the child of node 106.

The IAB donor node 106 hosts the Central Unit (CU) 124 for all IAB nodes 102, 104 and 106. That is the IAB donor node 106 runs radio resource control (RRC), higher layer packet data convergence protocol (PDCP) and control functions for the subtending IAB topology. The DUs 114, 118, 122 host the lower L2 protocol layers (radio link control (RLC), medium access control (MAC)), and the physical (PHY) layer. Additionally, for L2 relaying between the DUs, there is an adaptation layer which takes care of routing and mapping of radio bearers to RLC channels. The adaptation layer may be on top of RLC layer. The CU 124 has two control interfaces to the IAB nodes: an RRC connection to the IAB-MT, and F1-C (control interface between CU and DU) to the IAB-DU. Hence both RRC signalling and F1-AP (F1 application protocol) are available for the IAB configuration and control. With this architecture the radio resources usage can have central coordination by the donor CU 124. According to some examples a donor node may be considered a node which has both CU and DU.

Figure 2:
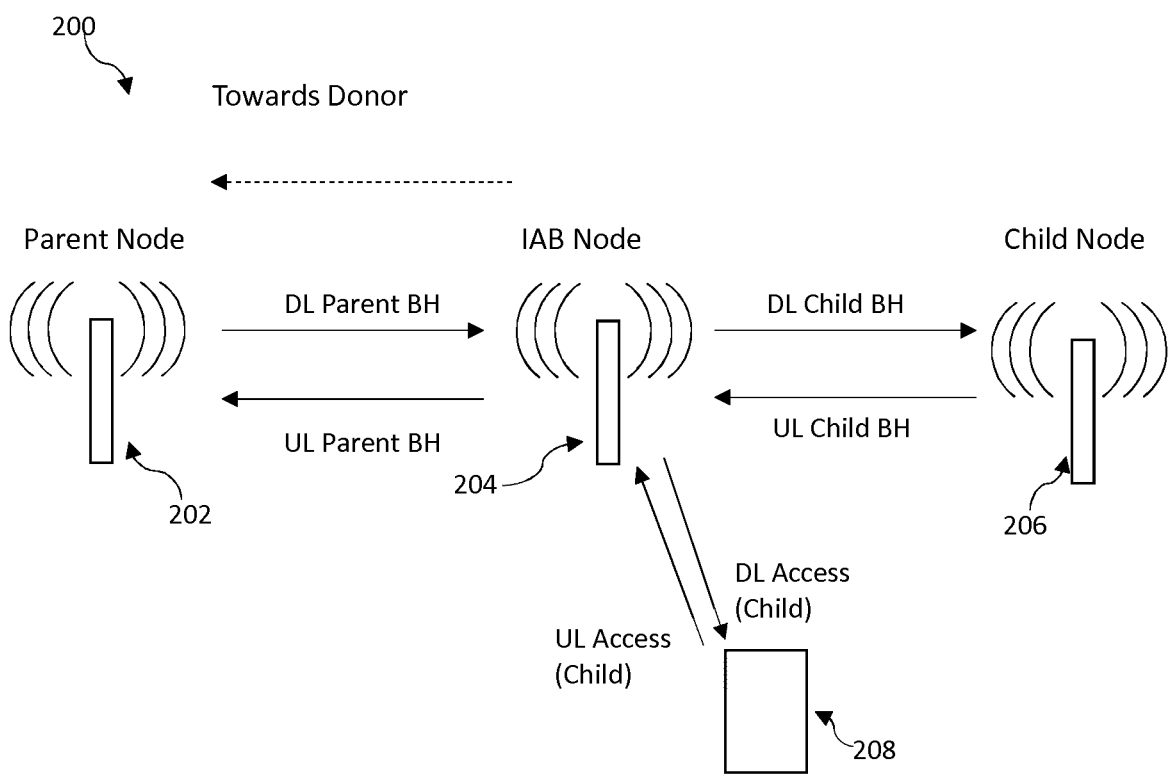
FIG. 2 shows a schematic example of an integrated access and backhaul architecture scenario where the invention may be implemented.

FIG. 2 schematically shows a simplified version of a system 200 comprising IAB nodes 202, 204 and 206, and is useful for understanding some terminology. A UE is schematically shown at 208. The UE 208 is in communication with IAB node 204. In this example IAB node 202 provides the connection to the core network, and therefore IAB node 202 comprises the parent IAB node to node 204. In this example IAB node 206 comprises a child IAB node to node 204.

IAB node 204 provides access to the network to UE 208. Therefore IAB node 204 may provide UL access (child) and DL access (child) to UE 208. On the backhaul, UL information sent from IAB node 204 to parent node 202 is referred to as "UL parent BH", and DL information sent from IAB node 202 to IAB node 204 is referred to as "DL Parent BH". UL information sent from IAB node 206 to IAB node 204 is referred to as "UL child BH", and DL information sent from IAB node 204 to IAB node 206 is referred to as "DL child BH".

3GPP TR 38.874 discusses resource allocation as follows.

From an IAB-node MT point-of-view, as in Rel. 15, the following time-domain resources can be indicated for the parent link:

Downlink time resource
  Uplink time resource
  Flexible time resource

From an IAB-node DU point-of-view, the child link has the following types of time resources:

Downlink time resource
  Uplink time resource
  Flexible time resource
  Not available time resources (resources not to be used for communication on the DU child links)

Each of the downlink, uplink and flexible time-resource types of the DU child link can belong to one of two categories:

Hard: The corresponding time resource is always available for the DU child link
  Soft: The availability of the corresponding time resource for the DU child link is explicitly and/or implicitly controlled by the parent node.

In order to support mechanisms for resource allocation for IAB nodes, semi-static configuration is supported for the configuration of IAB node DU resources. In addition, dynamic indication (L1 signalling) to an IAB node of the availability of soft resources for an IAB node DU is supported.

In 3GPP TR 38.874 some tables are provided (Tables 7.3.3-1 and 7.3.3-2) which capture the possible combinations of DU and MT behavior. Table 7.3.3.-1 applies in case of time division multiplexing (TDM) operation, where there can be no simultaneous transmission in the DU and the MT, nor any simultaneous reception in the DU and the MT. Table 7.3.3.-2 applies in case of space division multiplexing (SDM) operation, where there can be simultaneous transmission in the DU and the MT, alternatively simultaneous reception in the DU and the MT.

For conciseness these tables are not repeated here, but the following definitions apply:

MT: Tx" means that the MT should transmit if scheduled
  "DU: Tx" means that the DU may transmit
  "MT: Rx" means that the MT should be able to receive (if there is anything to receive)
  "DU: Rx" means that the DU may schedule uplink transmissions from child nodes or UEs
  "MT: Tx/Rx" means that the MT should transmit if scheduled and should be able to receive, but not simultaneously
  "DU: Tx/Rx" means that the DU may transmit and may schedule uplink transmission from child nodes and UEs, but not simultaneously
  "IA" means that the DU resource is explicitly or implicitly indicated as available
  "INA" means that the DU resource is explicitly or implicitly indicated as not available
  "MT: NULL" means that the MT does not transmit and does not have to be able to receive
  "DU: NULL" means that the DU does not transmit and does not schedule uplink transmission from child nodes and UEs The Tables assume an IAB not capable of full-duplex operation.

Proposed extensions to Rel. 15 include supporting use of Synchronization Signal Blocks (SSBs) orthogonal to SSBs used for UEs (via TDM and/or frequency division multiplexing (FDM)), for inter-IAB-node discovery and measurements, including additional synchronization signal measurement timing configuration (SMTC) periodicities and time-domain mapping of SSB locations (e.g. enable muting patterns to deal with half-duplex constraint).

Figure 3:
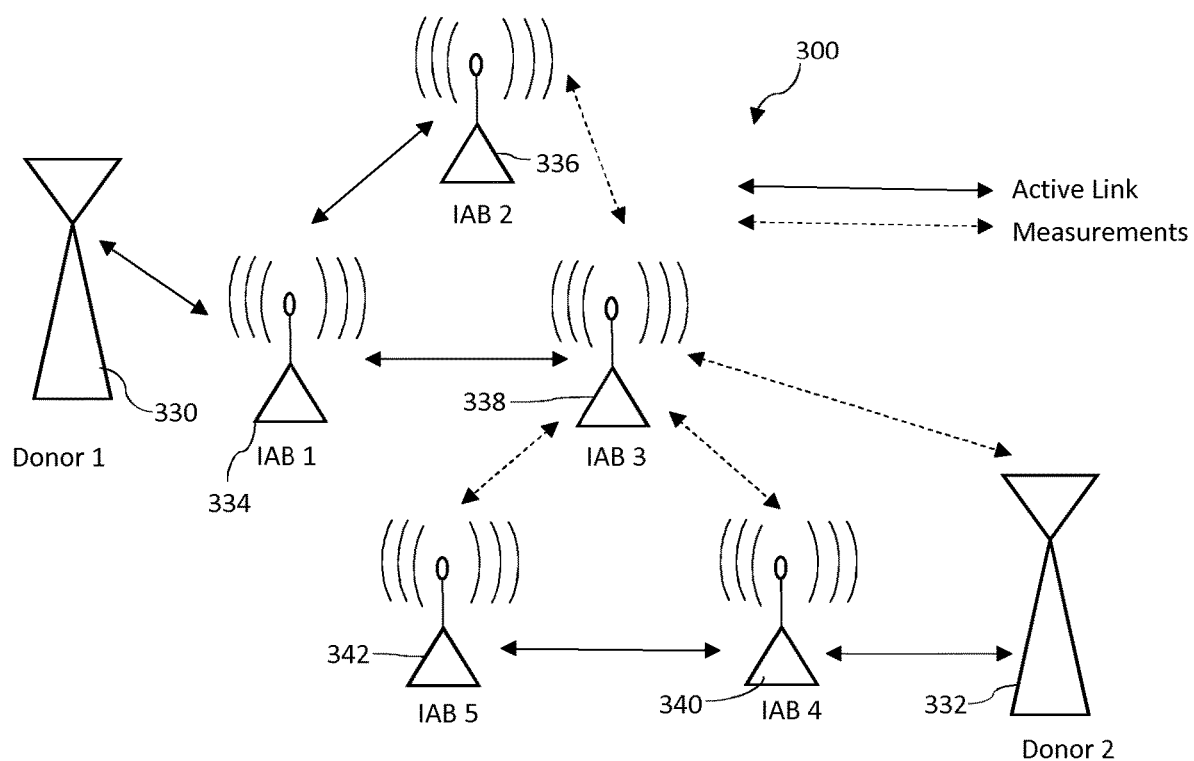
FIG. 3 shows a schematic example of an integrated access and backhaul architecture scenario where the invention may be implemented.

An idea of the objective is to allow search of other IAB nodes by IAB nodes that are already serving UEs or other IAB nodes. This procedure is called "Stage 2 discovery" to make a distinction to SSB search and transmission for initial network access of IAB nodes. Stage 2 discovery and measurements are depicted in FIG. 3 that shows a network configuration 300 with two donor gNBs 330 and 332 that have a wired connection towards the core network. Also shown are five IAB nodes 334, 336, 338, 340 and 342 that are wirelessly connected to a donor or other IAB nodes. Besides links that are active for backhaul data transmission, knowledge of link quality to some candidate connections is needed for routing changes that may be required for load optimization and to react to link failures. Besides monitoring existing candidate connections, measurements are needed for discovering new candidate connections.

In a RAN WG1 meeting it has been agreed that SSB transmission configuration information (i.e. the necessary information for the DU to determine when to transmit SSB) and SSB reception configuration information (i.e. the necessary information for the MT to determine when to search for SSB) for IAB inter-node measurements are determined in a centralized manner, i.e. not locally by the IAB node. Furthermore, an IAB node is provided with configuration of SSB transmission and reception information for IAB inter-node measurements. Details were for further study.

Based on this agreement and Work Item Description (WID) RP-182882, it is assumed that IAB nodes will be configured with periodical SSB TX and RX patterns that allow mutual discovery between nodes taking into account the half-duplex constraint (see Table 7.3.3.-1 and Table 7.3.3.-2 of TR 38.874). The present inventors have identified a problem that it needs to be decided how SSB TX/RX configuration relates to resource allocation for Parent BH link (UL and DL), and Child links (UL and DL) traffic. The same problem also exists if Stage 2 discovery is based on CSI-RS (channel state information reference signals).

As will be discussed in more detail below, in the present disclosure it is proposed that IAB nodes are configured for transmission (Tx) and reception (Rx) for measurements, but also have the capability to schedule Tx and Rx of data. That is within a same node there is the MT (part of the UE functions) and the DU (part of the gNB functions).

By way of example, take IAB node 104 of FIG. 1. According to the 3GPP agreements, IAB node's DU 118 is configured to receive an SSB Tx configuration, and MT 120 receives SSB Rx configuration. Although there is no 3GPP agreement, these configurations will likely come from CU 124 of the parent node 106, as they depend on the network topology. In another embodiment these configurations come from O&M (Operation and maintenance) entity. It can be assumed that as these configurations may come from the same source that they don't conflict, but SSB Tx and Rx configuration is done taking into account that half-duplex node are assumed for Rel-16.

According to the proposal of the present disclosure, the Tx and Rx configurations can be treated differently. According to the present disclosure:

DU follows the received Tx configuration. In some examples it may be considered that the DU rigorously follows the Tx configuration. This is because if SSB transmissions are skipped the measurements carried out by the other nodes may be inaccurate or ruined.

The MT does not always need to follow the received Rx configuration. The Rx configuration is to guarantee measurement opportunities and it is up to implementation which opportunities are utilized. Decision on utilization may depend on e.g. the number of supported Rx beams, the results of past measurements, and the requirements set for measurement accuracy and reporting.

Thus an idea of the proposal is to enable utilization of unused measurement opportunities for data and control transmissions, rather than only allow MT and the DU of the same IAB node to sleep and save power. Using the measurement opportunities for data and control transmissions may also include related reference signal transmissions. For instance, the IAB node could send CSI-RS signals for child IAB nodes and UEs that it serves or receive sounding reference signals from the served IAB nodes and UEs in the unused measurement resources. This is enabled by means of appropriate resource configuration and the related functionality of the IAB node. There are alternative ways to benefit from the unused time resources.

In one example resource configuration, an IAB node 104 may always assign unused time resources for DU's 118 DL child link. The DL could be scheduled at least for access UEs. The child DL BH link might not be available if the child node is part of the discovery. On the other hand, depending on the Rx processing capability of the IAB node, it might be able to receive both discovery signal and PDCCH/PDSCH at the same time (e.g. FDM'ed with each other). In an example it may be specified that Rx time resource configured for DU as DL would allow the DU to transmit in DL but only towards access UEs. Or in another example it may be specified that even if Rx time resource was configured for DU as "Not Available", DU would be allowed to schedule it at least for access UEs DL.

In another example resource configuration, the free time resources for DU's 118 DL child link could be allowed only if the node 104 has received an acknowledgement for that from a parent node 106 or CU 124. The acknowledgement could come e.g. as a separate RRC message or MT or DU scheduling configuration or their combination.

It is noted that the described procedure applies equally well for Tx and Rx of CSI-RS if discovery and measurements are based on those reference signals.

Figure 4:
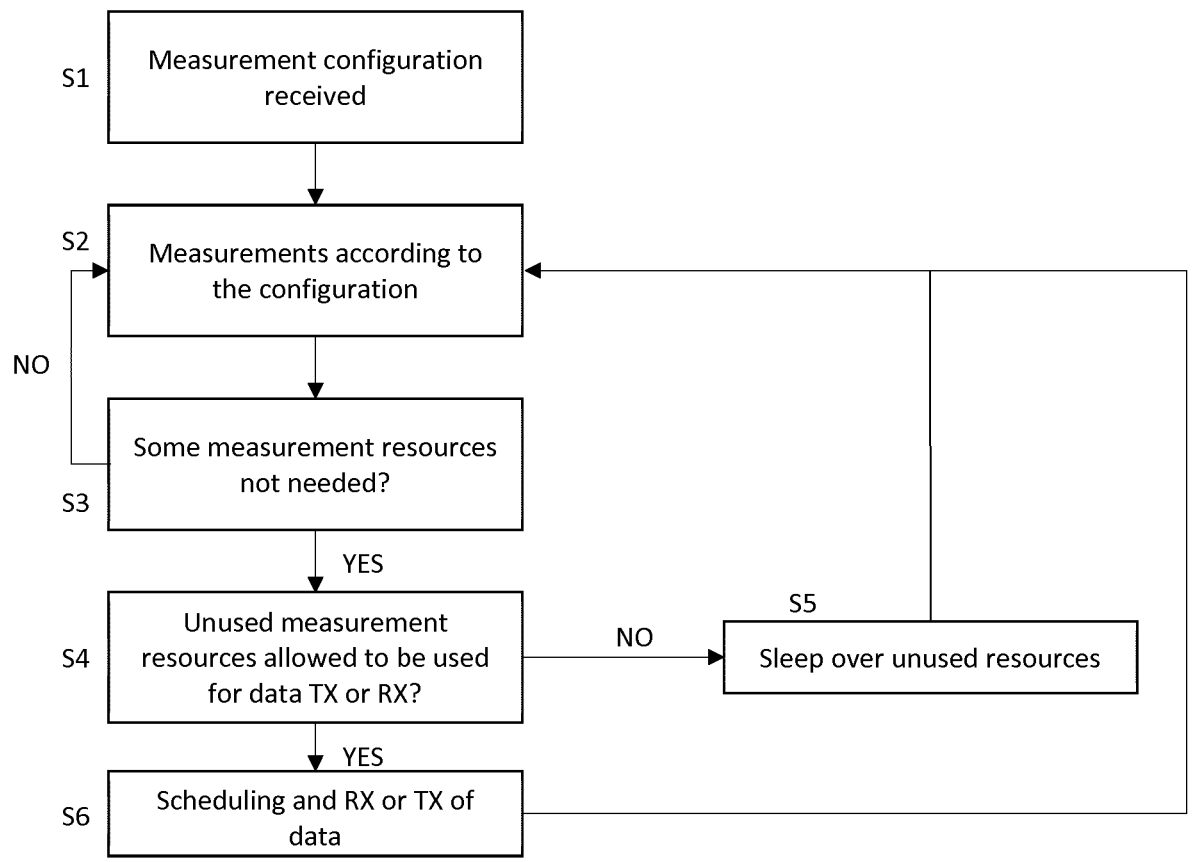
FIG. 4 is a flow-chart of a method according to an example.

FIG. 4 is a flow-chart schematically showing a method according to an example. This flow-chart depicts the process flow for utilizing unused measurement resources for data transmissions at an IAB. For purposes of explanation, the IAB node in question will be considered to be IAB node 104 of FIG. 1. In some examples the DU 118 of IAB node 104 is configured for transmitting reference signals, and the MT 120 of IAB node 104 is configured for receiving reference signals.

At S1, a measurement configuration is received at IAB node 104. In some examples the configuration is received from a CU 124 and/or an IAB donor node 106. The measurement configuration comprises an Rx measurement configuration. In some examples the MT 120 is configured to carry out the Rx measurement.

Generally, and as shown at S2, the IAB node 104 carries out measurements according to the received configuration.

However, and as shown at S3, the IAB node 104 carries out a determination as to whether any of the configured measurement resources are not needed. In particular, S3 may comprise determining whether any configured Rx measurement resources are not needed. In some examples the measurement resources comprise time resources. It will be understood that "not needed" may mean temporarily rather than permanently not needed. Therefore in some examples S3 may comprise a determination of whether measurement resources are not needed for a certain or pre-determined period of time. In some examples the pre-determined period of time is configurable. Therefore it may be considered that IAB node 104 is configured to selectively measure received reference signals in dependence of a determination of whether measurement of received reference signals is required.

Additionally or alternatively, at S3 the IAB node 104 may receive an indication from CU 124 that semi-statically configured measurement opportunities can be temporarily released. The released resources could be treated the same way as resources that the node 104 autonomously considers as not needed.

If the outcome of the determination at S3 is "No" (i.e. all of the configured resources are needed), then the method loops back to S2.

If on the other hand the outcome of the determination at S4 is "Yes" (i.e. it is determined that some of the configured resources are not needed), then the method proceeds to S4.

At S4, it is determined whether any of the unused measurement resources are allowed to be used for data Tx or Rx. More particularly S4 may comprise determining whether the unused measurement resources can be used e.g. for child-link scheduling (i.e. for scheduling between node 104 and a child of node 104 e.g. node 102).

If the determination at S4 is "No", then the method loops back to S2 via S5. At S5, the IAB node 104 sleeps or goes in to a low power mode over the unused resources (e.g. over an unused time resource). More specifically, the DU 118 and MT 120 of IAB node 104 may sleep.

If on the other hand the determination at S4 is "Yes" (i.e. unused measurement resources can be used for data Tx or Rx) then the method proceeds to S6.

At S6, the IAB node 104 schedules Tx and/or Rx of data during the unused measurement resources. For example IAB node 104 may schedule data transmission and reception with child node 102. Therefore it may be considered in examples that the IAB node 104 is configured to use the time domain resource of the apparatus for communication of data instead of for measurement of received reference signals, when it is determined that the measurement of received reference signals is not required. According to some examples the communication of data is carried out by DU 118. In some examples the communication of data is between IAB 104 and another IAB (e.g. a child IAB such as IAB 102). In some examples the communication of data is between IAB 104 and a UE (e.g. UE 110). In some examples the communication takes place on an NR Uu interface.

According to some examples the flow may from time to time return to performing measurements over the configured measurement opportunities, as shown for example by the arrow connecting S6 to S2. This may be done in order to discover any new candidate connections. According to some examples how and when this occurs depends on measurement requirements.

It will be understood that in examples there may be one or more alternatives as to how the node 104 determines whether scheduling for data transmission or reception is allowed instead of using the opportunity for measurements (i.e. S4). For example the IAB 104 may be configured to determine that the measurement of received reference signals is not required when an indication is received at the apparatus indicating that a reference signal is not present, or it is determined based on an earlier measurement that the reference signal is below a predefined threshold. In some examples the IAB node 104 is configured to determine that the measurement of received reference signals is not required based on monitoring performance requirements of the IAB node 104, and a determination that the performance requirements of the IAB node 104 are being met. Some of the possible alternatives are set-out in more detail in the bullet points below.

- scheduling DL for access UEs could be allowed. Access UEs should have matching resource configuration in order to receive DL transmissions. This could be possible without generating serious interference situations because it is plausible that nodes in a region should follow the same general SSB Rx/Tx configuration so that all the transmissions in a region would be in DL direction in the time resources configured for SS Tx/Rx. In some examples there may also be an RRC configuration allowing or forbidding use of the free Rx resources for any transmissions.
- Semi-static DU configuration DL-soft or Flexible-soft could allow DL child link scheduling. In some examples the semi-static resource configuration would be done considering the configuration of the child node for SSB Tx and Rx, as the child node does not receive anything in BH DL when its SSB Tx or Rx is on-going. This can be handled by using following options,
  - The parent and the child node SSB Rx opportunities are configured such that SSB Rx opportunities are not overlapping.
  - The parent node has the knowledge of child node's SSB RX opportunities.
  - The child node prioritized its SSB Tx even when parent node schedules DL transmission.
- MT configuration Flexible (or DL) in the time resource could allow DL scheduling for the child link. In some examples DU resources may be available only if the corresponding MT resource is flexible. In some examples flexible means that DL and/or UL scheduling may be enabled. Flexible may also be characterized by means of transmission and reception of DU (or MT). For example, DU Tx may be seen as the Child DL and DU Rx may be seen as the Child UL, respectively. In some examples the MT DL can also be released for DU soft resource.
- Measurement resource configuration could change some rules otherwise applied with semi-static resource configuration. For instance, when the DU resource of the node 106 is configured as NA, the DU of node 104 could be normally configured only as hard or NA. However, also semi-static DU configurations of soft (mainly DL-soft or Flexible-soft) could be allowed for DU of 104 for resources that are configured for measurements for MT of 104. Normally the soft resources of DU of node 104 would be triggered available by the node 106, but with measurement configuration the trigger would be generated in node 104 when it decides that measurements are not needed.
- DU configuration "Not Available" in the time resource could forbid DL scheduling for the child link.
- It will be understood that the examples may enable optimized resource use. Examples may also reduce latency. The examples may also be provided through simple specification and signaling.

Figure 5:
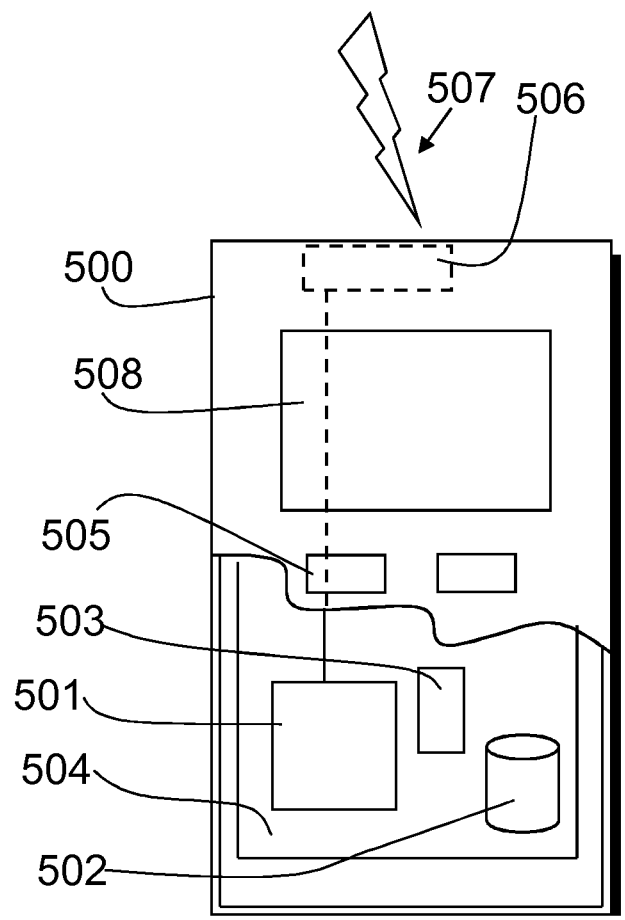
FIG. 5 schematically shows parts of a user equipment according to an example.

A possible wireless communication device will now be described in more detail with reference to FIG. 5 showing a schematic, partially sectioned view of a communication device 500. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 500 may receive signals over an air or radio interface 507 via appropriate apparatus for receiving and may transmit signals via appropriate apparatus for transmitting radio signals. In FIG. 5 transceiver apparatus is designated schematically by block 506. The transceiver apparatus 506 may be provided for example by means of a radio part and associated antenna arrangement. The antenna arrangement may be arranged internally or externally to the wireless device.

A wireless device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the wireless device by means of a suitable user interface such as key pad 505, voice commands, touch sensitive screen or pad, combinations thereof or the like. A display 508, a speaker and a microphone can be also provided. Furthermore, a wireless communication device may comprise appropriate connectors (either wired or wireless) to other devices and/or for connecting external accessories, for example hands-free equipment, thereto.

Figure 6:
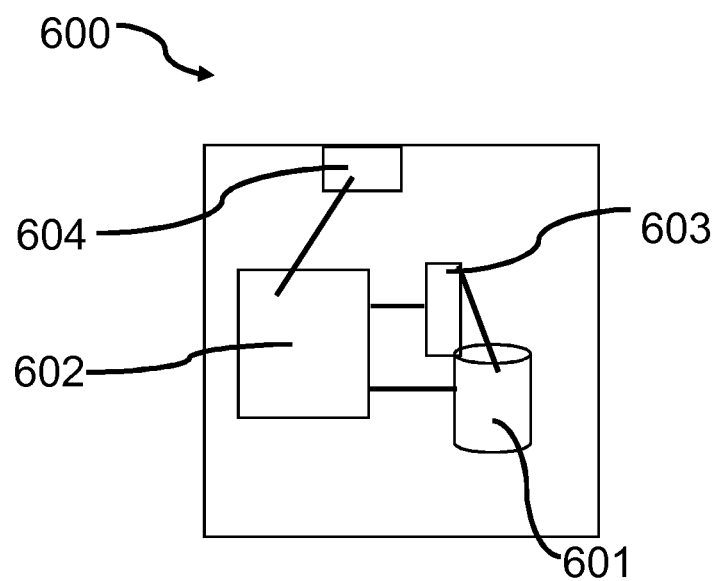
FIG. 6 schematically shows parts of a network apparatus according to an example.

FIG. 6 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. An IAB node may also take the same or similar structure as that shown in FIG. 6. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, a base station may have such a control apparatus as well as a control apparatus being provided in a radio network controller.

The control apparatus 600 can be arranged to provide control on communications in the service area of the system. The control apparatus 600 comprises at least one memory 601, at least one data processing unit 602, 603 and an input/output interface 604. Via the interface the control apparatus can be coupled to a receiver and a transmitter of the base station. The receiver and/or the transmitter may be implemented as a radio front end or a remote radio head. For example the control apparatus 600 or processor 601 can be configured to execute an appropriate software code to provide the control functions.

An alternative of implementing IAB nodes is to combine a wireless device 500 as a MT unit with an apparatus 600 as a DU.

Figure 7:
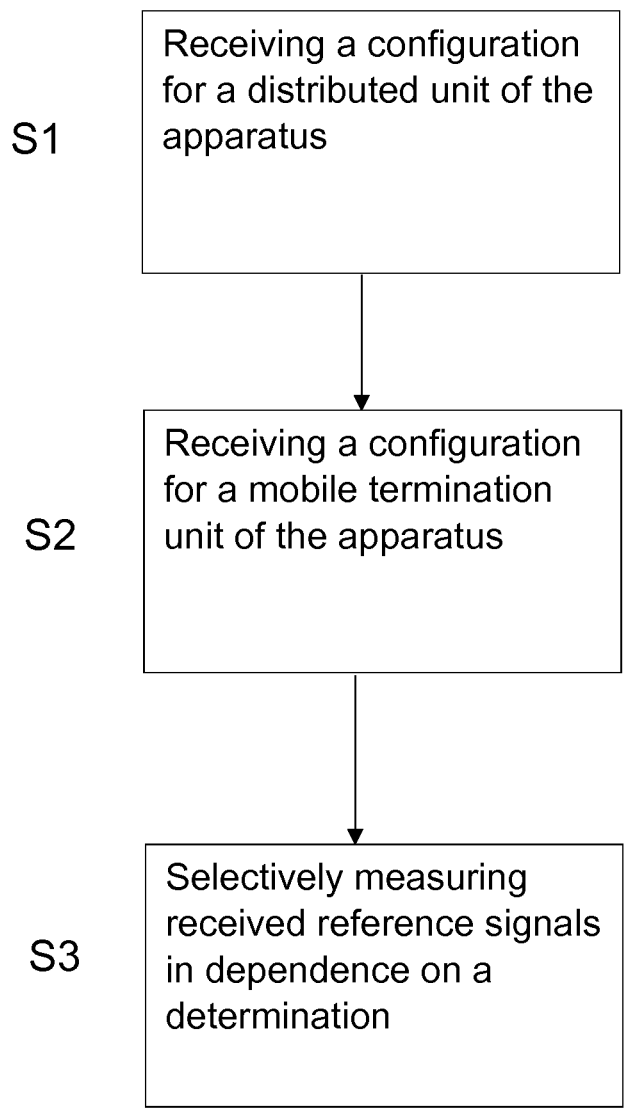
FIG. 7 is a flow-chart of a method according to an example.

FIG. 7 is a flow chart of a method according to an example. The method of FIG. 7 may be carried out at an apparatus. The apparatus may comprise an IAB node.

At S1 the method comprises receiving a configuration for a distributed unit of the apparatus for transmitting reference signals using a time domain resource of the apparatus, in accordance with a time domain transmission pattern.

At S2 the method comprises receiving a configuration for a mobile termination unit of the apparatus for reception of reference signals using the time domain resource of the apparatus, in accordance with a time domain reception pattern.

At S3 the method comprises selectively measuring received reference signals in dependence on a determination of whether measurement of received reference signals is required.

Figure 8:
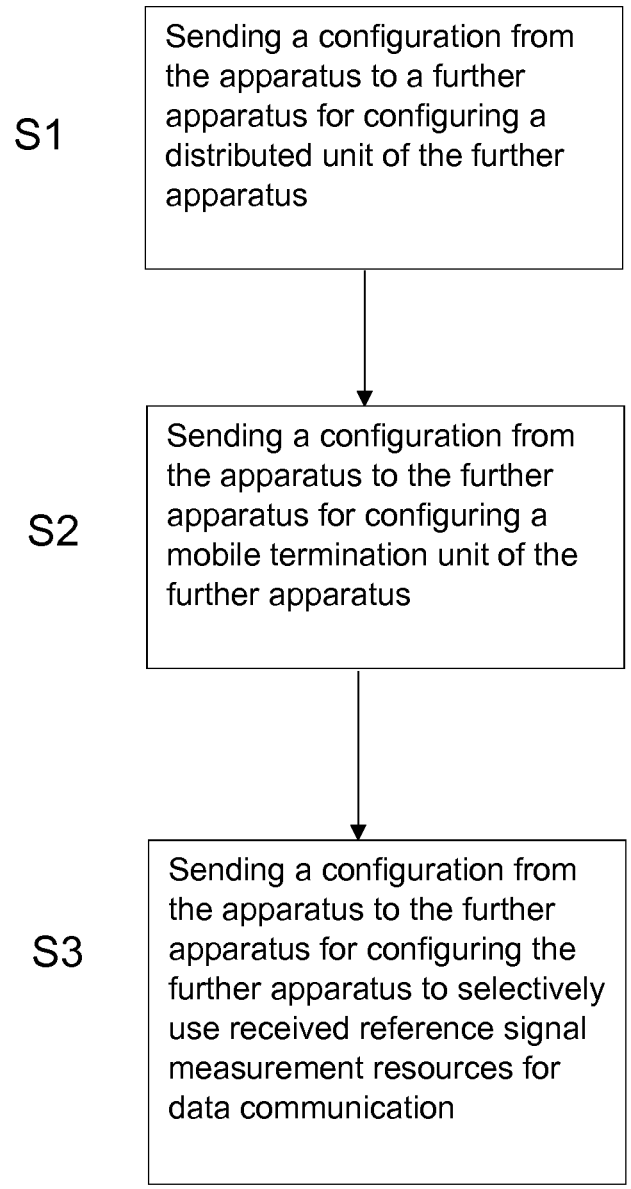
FIG. 8 is a flow-chart of a method according to an example.

FIG. 8 is a flow chart of a method according to an example. The method of FIG. 8 may be carried out at an apparatus. The apparatus may comprise a Central Unit (CU), or an apparatus hosting a CU such as a donor IAB At S1 the method comprises sending a configuration to a further apparatus for configuring a distributed unit of the further apparatus for transmitting reference signals using a time domain resource of the further apparatus, in accordance with a time domain transmission pattern.

At S2 the method comprises sending a configuration to the further apparatus for configuring a mobile termination unit of the further apparatus for reception of reference signals using the time domain resource of the apparatus, in accordance with a time domain reception pattern.

At S3 the method comprises sending a configuration to the further apparatus for configuring the further apparatus to selectively use received reference signal measurement resources for data communication, in dependence on a determination of whether measurement of received reference signals is required by the further apparatus.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising least one processor; and
at least one memory including computer program code, the at least one memory and computer program code configured to, with the at least one processor, cause the apparatus to perform:
receiving a configuration for a distributed unit of the apparatus for transmitting reference signals using a time domain resource of the apparatus, in accordance with a time domain transmission pattern;
receiving a configuration for a mobile termination unit of the apparatus for reception of reference signals using the time domain resource of the apparatus, in accordance with a time domain reception pattern; and
selectively measuring received reference signals in dependence on a determination of whether measurement of received reference signals is required,
wherein the at least one memory and computer program code are further configured to, with the at least one processor, cause the apparatus to perform determining that the measurement of received reference signals is not required based on discovery and monitoring performance requirements of the apparatus, and a determination that the performance requirements of the apparatus are being met.

2. An apparatus according to claim 1, wherein the at least one memory and computer program code are further configured to, with the at least one processor, cause the apparatus to perform using the time domain resource of the apparatus for communication of data instead of for measurement of received reference signals, when it is determined that the measurement of received reference signals is not required.

3. An apparatus according to claim 2, wherein the at least one memory and computer program code are further configured to, with the at least one processor, cause the apparatus to perform the communication of data using the distributed unit in accordance with a resource configuration of the distributed unit.

4. An apparatus according to claim 3, wherein the at least one memory and computer program code are further configured to, with the at least one processor, cause the apparatus to perform the communication of data on a downlink child-link to a child node of the apparatus.

5. An apparatus according to claim 1 wherein the at least one memory and computer program code are further configured to, with the at least one processor, cause the apparatus to perform the communication of data in response to an indication that communication of data is allowed.

6. An apparatus according to claim 5, wherein the at least one memory and computer program code are further configured to, with the at least one processor, cause the apparatus to perform receiving the indication by one or more of the following signalling schemes:
a radio resource control message;
a semi-static configuration of the mobile termination unit;
a semi-static configuration of the distributed unit;
a combination of mobile termination unit configuration and distributed unit configuration;
an implicit indication; dedicated Downlink Control Information; or
group common Downlink Control Information.

7. An apparatus according to claim 5, wherein the at least one memory and computer program code are further configured to, with the at least one processor, cause the apparatus to perform configuring the distributed unit in a downlink-soft or flexible-soft configuration for communication of data with a child node.

8. An apparatus according to claim 5, wherein the at least one memory and computer program code are further configured to, with the at least one processor, cause the apparatus to perform configuring the mobile termination unit in a flexible configuration or downlink configuration for communication of data with a child node.

9. An apparatus according to claim 5, wherein the at least one memory and computer program code are further configured to, with the at least one processor, cause the apparatus to perform communication of data with a child node when a mobile termination unit of the child node is not measuring reference signals or a distributed unit of the child node is not transmitting reference signals.

10. An apparatus according to claim 5, wherein the at least one memory and computer program code are further configured to, with the at least one processor, cause the apparatus to perform making the distributed unit unavailable for the communication of data.

11. An apparatus according to claim 5, wherein the at least one memory and computer program code are further configured to, with the at least one processor, cause the apparatus to receive a soft resource configuration for the distributed unit when a resource configuration is not available for a parent node of the distributed unit.

12. An apparatus according to claim 5, wherein the at least one memory and computer program code are further configured to, with the at least one processor, cause the apparatus to perform receiving the indication from one or more of: a Central Unit; or a parent node.

13. An apparatus according to claim 1, wherein the at least one memory and computer program code are further configured to, with the at least one processor, cause the apparatus to perform determining that the measurement of received reference signals is not required when an indication is received at the apparatus indicating that a reference signal is not present, or it is determined based on an earlier measurement that the reference signal is below a predefined threshold.

14. An apparatus according to claim 1, wherein the reference signals comprise Synchronization Signals or Channel State Information Reference symbols for integrated access and backhaul stage 2 discovery.

15. An apparatus according to claim 14, wherein the apparatus comprises an integrated access and backhaul node.

16. An apparatus according to claim 1, wherein the at least one memory and computer program code are further configured to, with the at least one processor, cause the apparatus to perform receiving the transmission pattern but not the reception pattern at the distributed unit, and receiving the reception pattern but not the transmission pattern at the mobile termination unit.

17. A method comprising:
receiving a configuration for a distributed unit of an apparatus for transmitting reference signals using a time domain resource of the apparatus, in accordance with a time domain transmission pattern;
receiving a configuration for a mobile termination unit of the apparatus for reception of reference signals using the time domain resource of the apparatus, in accordance with a time domain reception pattern; and
selectively measuring received reference signals in dependence on a determination of whether measurement of received reference signals is required,
wherein the method further comprises determining that the measurement of received reference signals is not required based on discovery and monitoring performance requirements of the apparatus, and a determination that the performance requirements of the apparatus are being met.

\* \* \* \* \*